United States Patent
Fonteneau

(10) Patent No.: US 6,851,308 B2
(45) Date of Patent: Feb. 8, 2005

(54) DEVICE FOR FIXING A PRESSURE SENSOR INTENDED TO BE MOUNTED IN A TIRE

(75) Inventor: Christophe Fonteneau, Leguevin (FR)

(73) Assignee: Siemens VDO Automotive, Toulouse Cedex (FR)

( * ) Notice: Subject to any disclaimer, the term of this patent is extended or adjusted under 35 U.S.C. 154(b) by 92 days.

(21) Appl. No.: 10/429,678

(22) Filed: May 6, 2003

(65) Prior Publication Data

US 2003/0209065 A1 Nov. 13, 2003

(30) Foreign Application Priority Data

May 7, 2002 (FR) .............................................. 02 05654

(51) Int. Cl.[7] .......................... G01M 17/02; B60C 23/02
(52) U.S. Cl. ...................................... 73/146; 73/146.8
(58) Field of Search ............................... 73/146–146.8; 340/442–443

(56) References Cited

U.S. PATENT DOCUMENTS

| 5,569,849 A | * | 10/1996 | Cummings | ................. | 73/146.8 |
|---|---|---|---|---|---|
| 5,641,902 A | * | 6/1997 | Hong | ......................... | 73/146.8 |
| 5,687,672 A | * | 11/1997 | Gabriel | ...................... | 116/34 R |
| 6,006,600 A | * | 12/1999 | Cheng | ......................... | 73/146.5 |
| 6,240,943 B1 | * | 6/2001 | Smith | ............................. | 137/1 |
| 6,557,404 B2 | * | 5/2003 | Ziarati | ......................... | 73/146 |
| 6,588,264 B1 | * | 7/2003 | Johnson | ..................... | 73/146.8 |

FOREIGN PATENT DOCUMENTS

EP          0 958 947 A2     11/1999

* cited by examiner

*Primary Examiner*—Edward Lefkowitz
*Assistant Examiner*—Jermaine Jenkins
(74) *Attorney, Agent, or Firm*—Young & Thompson

(57) ABSTRACT

This device is intended for fixing a pressure sensor (4) to a valve (2) of a tire, the valve (2) comprising a valve element mounted in a valve stem. This device comprises a connecting rod (16) fixed at one of its ends to the pressure sensor (4) and at its other end to the valve (2). An air passage is also provided for connecting the valve element of the valve to the pressure sensor.

14 Claims, 2 Drawing Sheets

DEVICE FOR FIXING A PRESSURE SENSOR INTENDED TO BE MOUNTED IN A TIRE

FIELD OF THE INVENTION

The present invention relates to a device for fixing a pressure sensor intended to be mounted in a tire.

BACKGROUND OF THE INVENTION

It is known practice for the tire of a private car or of a heavy goods vehicle to be equipped with a pressure sensor so as to determine the pressure within this tire without having to connect a pressure sensor to the corresponding valve. Such sensors are found on vehicles equipped with tire-pressure monitoring systems. An indication of the pressure is then given to the driver of the vehicle by a display on the instrument panel. Several tire pressure monitoring systems of this style exist and are known to those skilled in the art.

A tire is generally mounted airtightly on a rim and a valve passes through the rim to place the volume delimited by the tire and the rim in communication with the outside. The valve allows air under pressure to be introduced in order to inflate the tire or, alternatively, and more rarely, to allow air to escape from this tire. In tire pressure monitoring systems, the pressure sensor is generally mounted at the valve on the inside of the tire.

In the known systems, the valve used is a special-purpose valve to which a pressure sensor is fitted. Often, the pressure sensor is fixed irreversibly to the valve. Mounting a pressure sensor therefore makes the valve more expensive and, in most cases, when the valve has to be changed, so does at least part of the sensor.

Furthermore, the design of the pressure sensor supports means that mounting these entails a relatively high number of parts and is therefore relatively complicated. In addition, the current supports are designed for entirely metal valves which cost more than the valves more commonly used which are made of rubber (with a metal insert).

SUMMARY OF THE INVENTION

It is therefore an object of the present invention to provide a device for fixing a sensor to a valve that can be fitted to a valve the stem of which is made of rubber, or the like. The cost price of the assembly consisting of the sensor mounted on the valve will preferably be lower than the prices currently observed. The device according to the invention will preferably make it possible to have two subassemblies, a first formed of the valve and a second incorporating the sensor electronics. Finally, the sensor will preferably be simpler to mount on the valve than the currently known mounting procedures.

To this end, the present invention proposes a device for fixing a pressure sensor on a valve of a tire, the valve comprising a valve element mounted in a valve stem.

According to the invention, this device comprises a connecting rod fixed at one of its ends to the pressure sensor and at its other end to the valve, and an air passage connects the valve element of the valve to the pressure sensor.

This fixing device introduces an additional connecting piece which does not exist in the current devices which are mounted directly on a valve. This piece is fitted on the one hand to the sensor and on the other hand to the valve. By virtue of this connecting piece, it is no longer necessary, to a large extent, to adapt the valve to suit the pressure sensor or vice versa. Mounting on any type of valve becomes possible. Mounting is also simplified.

In one preferred embodiment, the connecting rod is a tubular rod and thus allows air to pass between the valve element and the pressure sensor.

The pressure sensor end of the connecting rod is, for example, threaded and collaborates with a nut held captive in the pressure sensor.

In another alternative form of embodiment, the connection between the connecting rod and the valve is, for example, afforded by catching means comprising an elastically deformable part deforming radially when axial stress is applied to it. This elastically deformable part is advantageously a gland.

In the alternative form of embodiment described in the preceding paragraph, it may be anticipated that the valve stem is fixed to a rim and extends on each side of a bore made in the rim for mounting the valve stem, and that the elastically deformable part, in the mounted position, lies on the outside of the rim and of the tire. By thus choosing the outside diameter of the elastically deformable part in such a way that, in the unstressed state, it is smaller than the diameter of the bore made in the rim and that, compressed, it is roughly equal to or even greater than the diameter of this bore, removal of the sensor therefore becomes almost impossible without relaxing the stress applied to the elastically deformable part.

Still in this same alternative form of embodiment, the connecting rod may be a tubular compression rod equipped with a compression head, the latter may then be slideably mounted in a bearing bush, and the elastically deformable part may also have the compression rod passing through it and be sandwiched between the end of the bearing bush furthest from the pressure sensor and the compression head. Another advantageous connection at the pressure sensor is, for example, such that the connecting rod is pivotably mounted on two bearings secured to the pressure sensor and each produced on a cam-shaped lug, each lug bearing against the pressure sensor end of the bearing bush. Simple pivoting of the pressure sensor is then enough, by virtue of the appropriately shaped cams, to pull the compression rod and act on the elastically deformable element in order to obtain secure attachment.

At the connection between the valve and the connecting rod, it is also for example possible to provide a screw thread and a tapping so as to afford connection by screwing.

The connecting rod used in the present invention is preferably made of metal and it can then act as an antenna for the pressure sensor.

BRIEF DESCRIPTION OF THE DRAWINGS

The details and advantages of the present invention will be better apparent from the description which follows, made with reference to the attached schematic drawing in which.

DETAILED DESCRIPTION OF THE INVENTION

Figure 1:
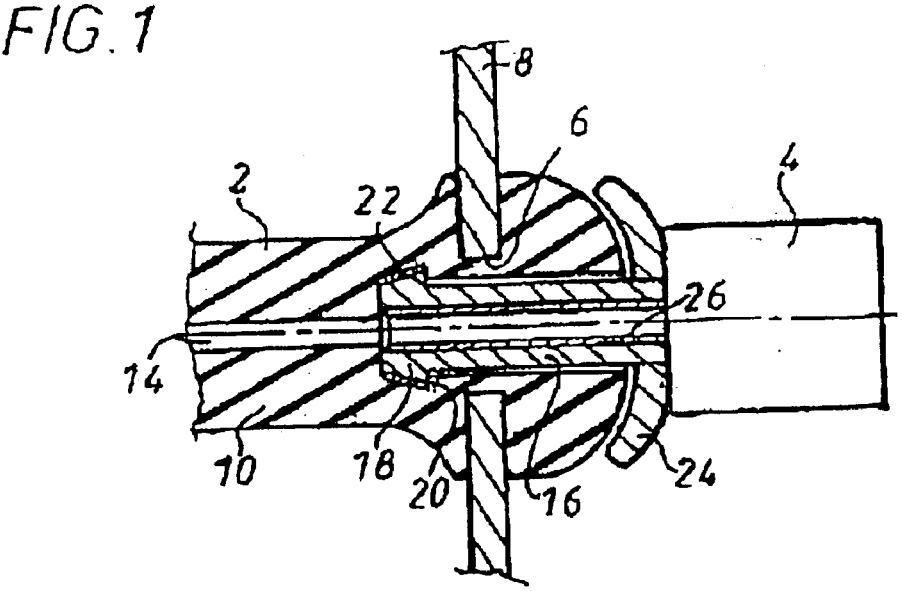
FIG. 1 depicts, in longitudinal section, a first device according to the invention for fixing a pressure sensor on a valve.

In each of the figures, we see a valve 2, a pressure sensor 4, a fixing device according to the invention for fixing the pressure sensor 4 on the valve 2. We also see in the figures the depiction of a bore 6 made in a partially depicted rim 8.

The valve 2 comprises a valve stem 10 in which is mounted a metal tube 12 (depicted only in FIG. 4) bearing a valve element (not depicted) which, in the closed position, prevents any passage of air and, in the open position, allows air to pass in one direction or the other.

The entity formed by the sensor proper, the support for this sensor and all the associated electronics for processing the information supplied by the sensor and sending it to a receiver is known collectively here as the pressure sensor 4.

The rim 8 is any motor car or heavy goods vehicle rim. It carries a tire (not depicted) inflated with air to a predetermined pressure. The rim and the tire define an airtight sealed space and the valve 2, when open, allows air to be introduced into the tire or, more rarely, some to be allowed to escape whereas it seals the tire when closed. In the figures, the part of the valve depicted to the right of the rim lies inside the tire while the part depicted to the left of the rim lies on the outside thereof.

The valve stem 10 is, for example, made of rubber. The valve 2 is therefore of the type known to those skilled in the art by the name of "snap-in". The valve stem 10 has a peripheral groove to accommodate the edge of the bore 6. The valve is mounted before the tire, placing the valve inside the rim (that is to say where the tire will go), and then slipping the head of the valve into the bore 6 and pulling, generally using a tool, on this valve head until the edge of the bore 6 sits in the peripheral groove of the valve stem 10. This mounted position is depicted in the four figures of the drawing.

The valve stem 10 has an interior passage 14. The latter provides the connection between the inside of the tire and the outside thereof. It in particular houses the tube 12 and the entire valve mechanism. In the present invention, this passage also, at least partially, houses the means that allow the pressure sensor 4 to be fixed to the valve 2.

In the first embodiment depicted in the drawing (FIG. 2), a tubular rod 16 protrudes from the pressure sensor 4. It may be fixed to the pressure sensor 4 by any means: welding, screwing, etc.

The free end of the tubular rod 16 has the shape of a hook. This end comprises a frustoconical part 18. The free end of the tubular rod 16 forms the top of the frustoconical part 18. The base of this frustoconical part forms a shoulder 20. The rest of the tubular rod 16 is therefore of constant diameter between the frustoconical part 18 and the sensor 4. This diameter of the tubular rod 16 corresponds for example to the diameter of the top of the frustoconical part 18. The interior passage 14 in the valve stem 10 has, at the pressure sensor end, a housing of a shape that complements the shape of the tubular rod 16. This housing in particular comprises a frustoconical region 22 to house the frustoconical part 18. This frustoconical region 22 is preferably, as depicted in FIG. 1, placed on the outside of the rim. Thus, when the tubular rod 16 is introduced into its housing, the frustoconical part 18 has to pass through the bore 6 to become housed in the frustoconical region 22. This allows for more secure fastening.

The pressure sensor 4 is then mounted simply by introducing the tubular rod 16 into the interior passage 14 of the valve 2 until the frustoconical part 18 of the tubular rod 16 becomes housed in the frustoconical region 22. The pressure sensor is then held in place by the matching shape of the tubular rod 16 and of the housing intended to house it.

To encourage the firm holding of the pressure sensor on the valve, it is possible to equip the pressure sensor 4 with a cup 24. The pressurized air in the tire then presses against the cup 24 to hold it, and therefore also the sensor, on the valve 2.

FIG. 1 also depicts a copper tube 26 which sits inside the tubular rod 16 and acts as an antenna for the emitter device of the pressure sensor 4. In order to have a sufficiently long antenna it is possible, if necessary, to make provision for the copper tube 26 to come into contact with the tube 12 which is generally made of metal.

Figure 2:
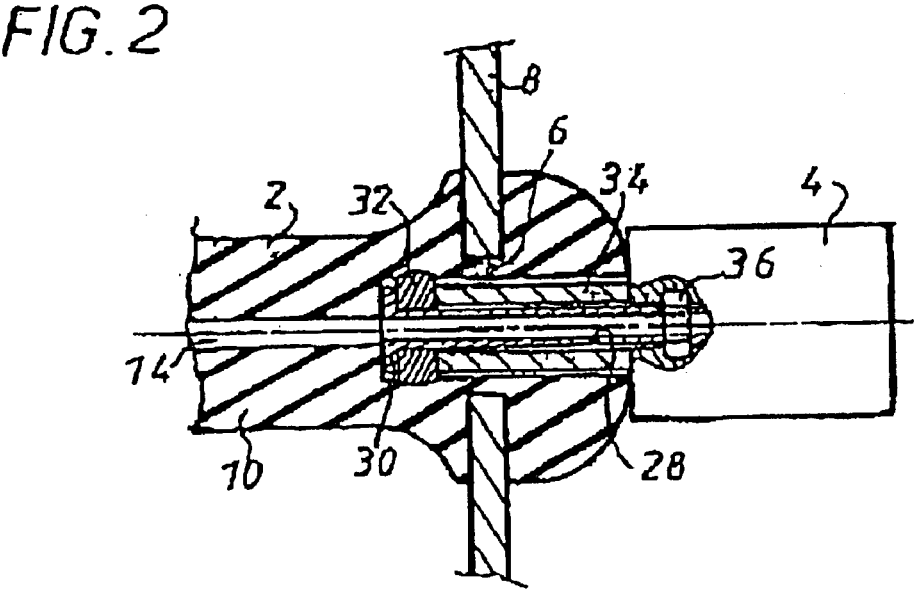
FIG. 2 depicts, in longitudinal section, a second embodiment of a device according to the invention for fixing a sensor on a valve.

In the embodiment depicted in FIG. 2, the fixing device comprising a compression rod 28 threaded at one end and having a compression head 30 at its other end. This fixing device also comprises a gland 32, a bearing bush 34 and a nut 36.

The compression head 30 is in the form of a disk fixed at right angles to the compression rod 28 and at the end thereof. The entity formed by the compression rod 28 and the compression head 30 is a tubular entity which therefore has passing right through it a passage intended to allow air to pass.

The nut 36 is held captive in the pressure sensor 4. The threaded end of the compression rod 28 is screwed into the nut 36. The gland 32 and the bearing rod 34 are mounted on the compression rod and sit between the compression head 30 and the pressure sensor 4. By screwing the compression rod 28 into the nut 36, the compression head 30 moves closer to the pressure sensor 4. The bearing bushing 34 then comes to rest against the pressure sensor 4 and the gland 32 is compressed between the compression head 30 and the bearing bush 34. This entity is placed in the interior passage 14 of the valve stem 10. When the gland 32 is compressed, its outside diameter increases and the gland therefore bears against the interior wall of the passage 14.

The fixing device is configured in such a way that, in the mounted position, the gland 32 lies, relative to the rim 8, on the opposite side to the pressure sensor 4. The gland 32, at rest, therefore has an outside diameter smaller than the diameter of the bore 6 so that it can be introduced into the interior passage 14 as far as its mounted position. Advantageously, when the gland is compressed, its outside diameter is roughly equal to, or even greater than, the diameter of the bore 6. Given then the thickness of the wall of the valve stem 10 at the bore 6, any withdrawal of the compressed gland from the interior passage 14 is prevented. This ensures that the sensor 4 is fixed very securely to the valve 2.

The mounting of this entity is very simple. Once the valve 2 is mounted in the bore 6, the compression rod, the gland 32 and the bearing bush 34 are placed in the interior passage 14. The threaded end of the compression rod 28 protrudes from the valve stem 10. All that is then required is for this threaded end to be screwed into the nut 36 held captive in the pressure sensor. The tightening torque that will allow sufficient deformation of the gland 32 to be obtained may be predetermined. Once this tightening torque is reached, the pressure sensor is fixed to the valve 2.

Figure 3:
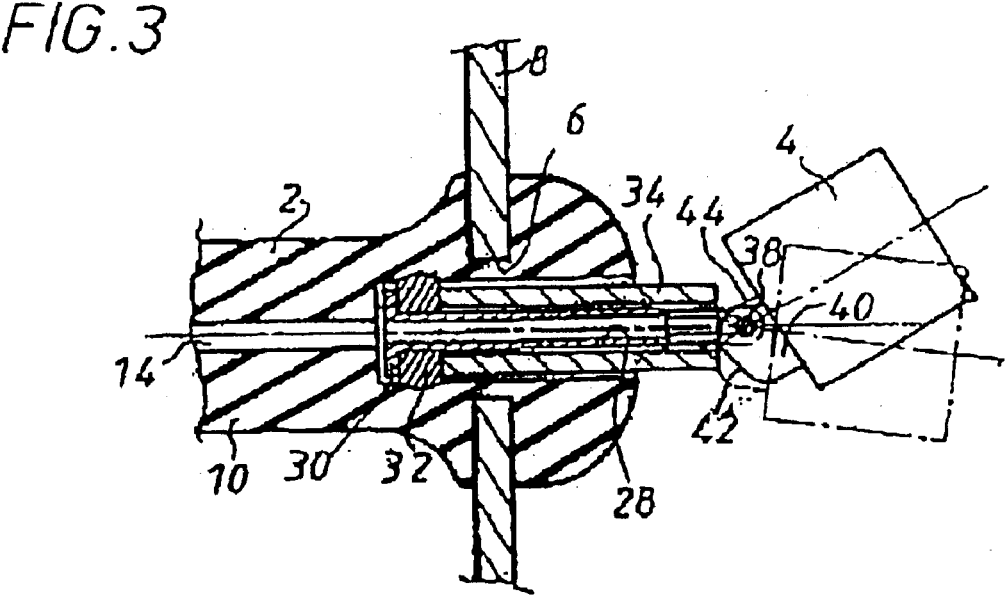
FIG. 3 depicts, in longitudinal section, a third embodiment of a device according to the invention for fixing a sensor on a valve.

FIG. 3 depicts an alternative form of embodiment of the fixing device depicted in FIG. 2. In this alternative form of embodiment we again see the principle of a stuffing box or gland. The difference here lies in the connection between the compression rod 28 and the pressure sensor 4.

Here, the opposite end of the compression rod 28 to the compression head 30 is no longer threaded but bears a pin 38 perpendicular to the compression rod 28. The pressure sensor 4 has two lugs 40, each lug housing a bearing for one end of the pin 38. Each bearing has a first face 42 and a second face 44, each of these faces being intended to bear against the bearing bush 34. The two bearing faces 42 and 44 are arranged more or less at right angles. The bearings of the pin 38 are arranged in such a way as to lie different distances away from the first face 42 and from the second face 44. Each of these bearings is relatively close to the first bearing face 42 and further from the second bearing face 44. Thus, by pivoting the pressure sensor 4 about the pin 38, the relative position of the compression rod 28 with respect to the bearing bush 34 is altered. When the bearing bush is bearing against the first bearing face 42, the gland 32 is in a position of rest whereas when the bearing bush 34 is bearing against the second bearing surface 44, the gland 32 is compressed and its outside diameter is at a maximum.

To mount the pressure sensor 4 on the valve 2, the gland 32 and the bearing bush 34 are mounted on the compression rod 28. The pin 38 is then fitted to connect this entity to the pressure sensor 4. In order to fit the pin 38, the bearing ring 34 is preferably brought to bear against the first bearing surface 42 of the lugs 40. The compression rod 28, with the gland 32 and the bearing bush 34, is then fully introduced into the interior passage 14 of the valve stem 10. The pressure sensor 4 is then pivoted in such a way that the second bearing face 44 of the lugs 40 comes against the bearing bush 34. The gland 32 is thus compressed and the sensor 4 is securely fixed to the valve 2. In this embodiment also, the gland 32 is, with respect to the rim 8, on the opposite side to the pressure sensor 4.

This embodiment first of all allows simpler mounting of the pressure sensor. It also has the advantage that, by virtue of the pivoting, the pressure sensor can be placed in the bottom of the rim, thus making it possible to limit the stress applied to this pressure sensor when the corresponding wheel is turning.

Figure 4:
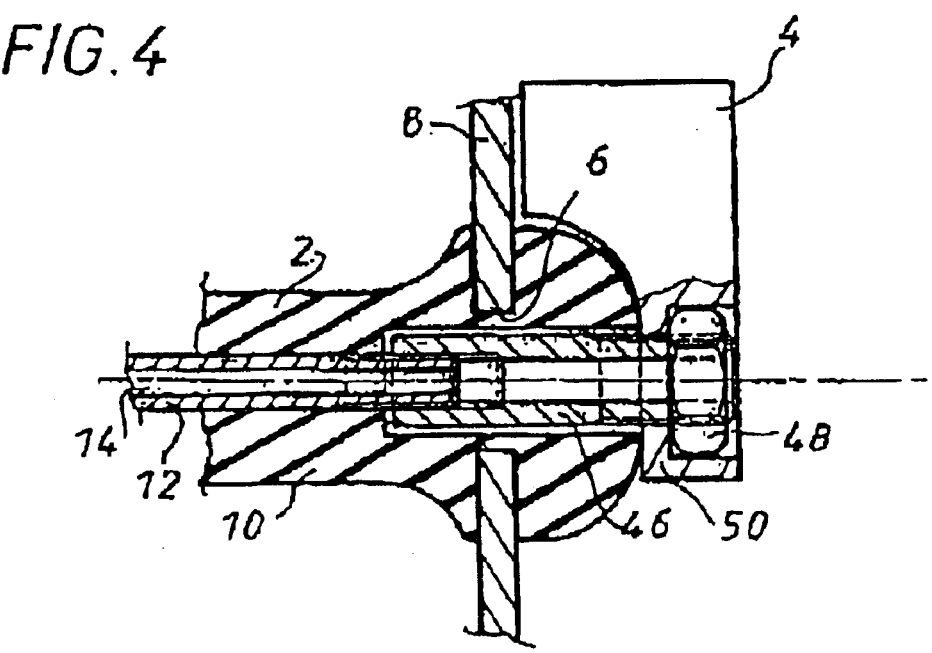
FIG. 4 depicts, in longitudinal section, a fourth embodiment of a device according to the invention for fixing a sensor on a valve.

The fourth embodiment depicted in FIG. 4 also allows the pressure sensor 4 to be placed in the bottom of the rim. The fixing device here comprises a tubular rod 46 and a nut 48.

The tubular rod 46 is tapped at one end and threaded at its other end. In this embodiment, provision is made for the tube 12 to be threaded at its end that will lie inside the valve stem 10. This screw thread collaborates with the tapping of the tubular rod 46. At the other end, the threaded part of the tubular rod 46 collaborates with the nut 48.

The entity is mounted by first of all screwing the tubular rod onto the tube 12 of the valve 2, then by placing the sensor 4 on the valve 2 and tightening the nut 48 onto the tubular rod 46. In the scenario depicted here, the pressure sensor is equipped with a lug 50 having a bore to position itself on the tubular rod 46 and intended to receive the nut 48. This lug 50 is shaped in such a way that as the nut 48 is tightened, the pressure sensor 4 presses against the bottom of the rim.

In the embodiments of FIGS. 2 to 4, provision may be made for the compression rod 28 or the tubular rod 46 to be made of conducting metal. These parts may thus serve as emitting antennas for the pressure sensor 4. It is also possible as depicted in FIG. 1 to make provision for a copper rod to extend, on the inside or on the outside of the fixing device, to constitute an emitting antenna.

In all these embodiments, it is noted that it is possible to achieve excellent securing of a pressure sensor on a valve of the "snap-in" type. This valve is little changed by comparison with a valve of this type from the prior art. All that is required is for the shape of the interior passage of the rubber valve stem to be altered to suit the shape of the fixing device and, in some cases, it is necessary to shorten the tube bearing the valve mechanism (and also to add a screw thread in the case of the fourth embodiment). These modifications are minor and do not add significant cost to the valve.

It is also found that the fixing devices set out hereinabove make it possible to have, on the one hand, the valve and, on the other hand, the pressure sensor. Even in the first embodiment, the pressure sensor can easily be detached from the valve. This is because all that is required is the provision of a reversible connection between the fixing device described and the pressure sensor 4. It thus becomes possible to change a tire valve at low cost without having at the same time to change the pressure sensor (in full or in part).

The present invention is not restricted to the embodiments described hereinabove by way of nonlimiting examples. It relates also to all the alternative forms of embodiment that are within the competence of the person skilled in the art, within the scope of the claims that follow.

What is claimed is:

1. A device for fixing a pressure sensor (4) on a valve (2) of a tire, the valve (2) comprising a valve element mounted in a valve stem, said device comprising a tubular connecting rod (16; 28; 46) fixed at one of its end to the pressure sensor (4) and at its other end to the valve (2), and an air passage connecting the valve element of the valve to the pressure sensor, said device being characterized in that the connection between the connecting rod (28) and the valve (2) is provided by catching means comprising an elastically deformable part (32) deforming radially when axial stress is applied to it.

2. The fixing device as claimed in claim 1, characterized in that the elastically deformable part is a gland (32).

3. The fixing device as claimed in claim 2, characterized in that the valve stem (10) is fixed to a rim (8) and extends on each side of a bore (6) made in the rim for mounting the valve stem (10), and in that the elastically deformable part (32), in the mounted position, lies on the outside of the rim (8) and of the tire.

4. The fixing device as claimed in claim 3, characterized in that the connecting rod is a tubular compression rod (28) equipped with a compression head (30), in that the compression rod (28) is slideably mounted in a bearing bush (34), and in that the elastically deformable part (32) has the compression rod (28) passing through it and is sandwiched between the end of the bearing bush (34) furthest from the pressure sensor (4) and the compression head (30).

5. The fixing device as claimed in claim 2, characterized in that the connecting rod is a tubular compression rod (28) equipped with a compression head (30), in that the compression rod (28) is slideably mounted in a bearing bush (34), and in that the elastically deformable part (32) has the compression rod (28) passing through it and is sandwiched between the end of the bearing bush (34) furthest from the pressure sensor (4) and the compression head (30).

6. The fixing device as claimed in claim 2, characterized in that the connecting rod (28; 46) is made of metal and acts as an antennae for the pressure sensor (4).

7. The fixing device as claimed in claim 1, characterized in that the valve stem (10) is fixed to a rim (8) and extends on each side of a bore (6) made in the rim for mounting on the valve stem (10), and in that the elastically deformable part (32), in the mounted position, lies on the outside of the rim (8) and of the tire.

8. The fixing device as claimed in claim 7, characterized in that the connecting rod is a tubular compression rod (28) equipped with a compression head (30), in that the compression rod (28) is slideably mounted in a bearing bush (34), and in that the elastically deformable part (32) has the compression rod (28) passing through it and is sandwiched between the end of the bearing bush (34) furthest from the pressure sensor (4) and the compression head (30).

9. The fixing device as claimed in claim 7, characterized in that the connecting rod (28; 46) is made of metal and acts as an antenna for the pressure sensor (4).

10. The fixing device as claimed in claim 1, characterized in that the connecting rod is a tubular compression rod (28) equipped with a compression head (30), in that the compression rod (28) is slideable mounted in a bearing bush (34), and in that the elastically deformable part (32) has the compression rod (28) passing through it and is sandwiched between the end of the bearing bush (34) furthest from the pressure sensor (4) and the compression head (30).

11. The fixing device as claimed in claim 10, characterized in that the connecting rod (28) is pivotably mounted on two bearings secured to the pressure sensor (4) and each produced on a cam-shaped lug (40), each lug (40) bearing against the bearing bush (34) end of the pressure sensor (4).

12. The fixing device as claimed in claim 11, characterized in that the connecting rod (28; 46) is made of metal and acts as an antennae for the pressure sensor (4).

13. The fixing device as claimed in claim 10, characterized in that the connecting rod (28; 46) is made of metal and acts as an antennae for the pressure sensor (4).

14. The fixing device as claimed in claim 1, characterized in that the connecting rod (28; 46) is made of metal and acts as an antennae for the pressure sensor (4).

* * * * *